(Model.)

W. C. WOODROW & J. W. HENDERSON.
STAMP CANCELING AND REGISTERING MACHINE.

No. 267,301. Patented Nov. 7, 1882.

Witnesses:
J. E. Clark.
P. B. Turpin.

Inventors
William C. Woodrow
James W. Henderson
By R. S. & A. P. Lacey
Attys

UNITED STATES PATENT OFFICE.

WILLIAM C. WOODROW AND JAMES W. HENDERSON, OF LYNCHBURG, OHIO.

STAMP CANCELING AND REGISTERING MACHINE.

SPECIFICATION forming part of Letters Patent No. 267,301, dated November 7, 1882.

Application filed July 13, 1882. (Model.)

*To all whom it may concern:*

Be it known that we, WILLIAM C. WOODROW and JAMES W. HENDERSON, citizens of the United States, residing at Lynchburg, in the county of Highland and State of Ohio, have invented certain new and useful Improvements in Stamp Canceling and Registering Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention has relation to devices for automatically registering the number of letters canceled; and it consists in the construction, combination, and arrangement of the several parts, as will be hereinafter fully described, and specifically pointed out in the claims.

Figure 1:
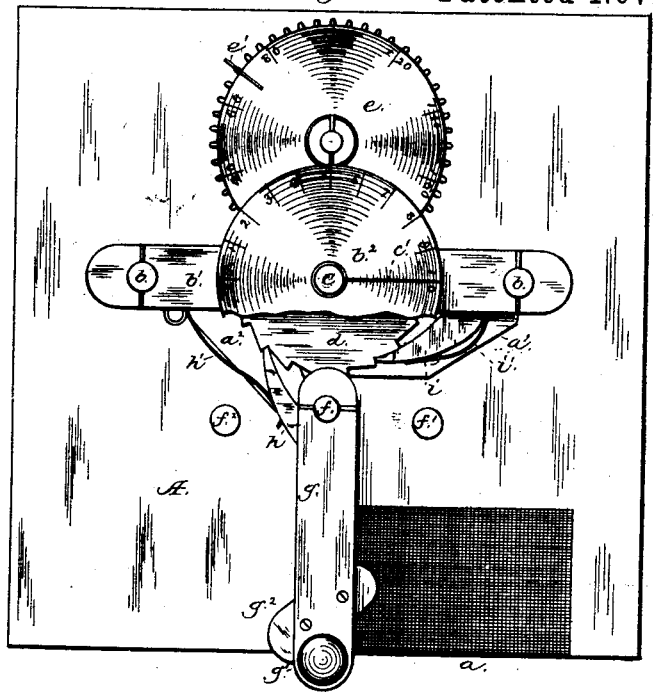
Figure 2:
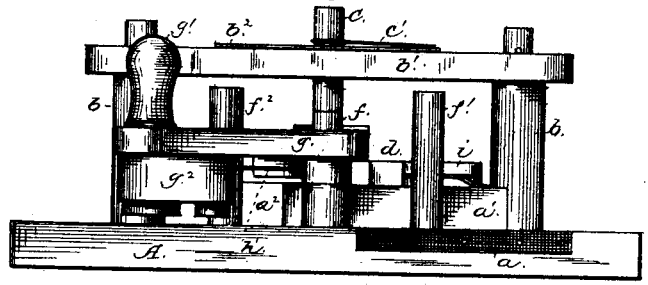
Figure 3:
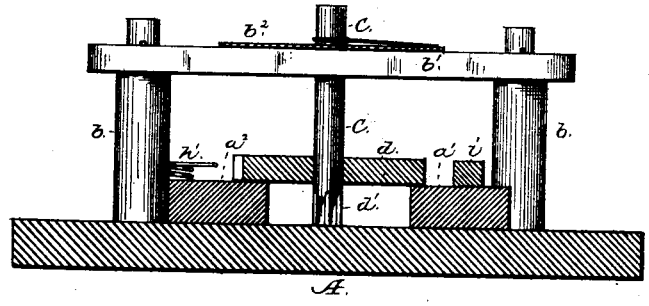

In the drawings, Figure 1 is a plan view, Fig. 2 is a front elevation, and Fig. 3 is a transverse section, of a device constructed according to our invention.

A represents the base-board. $a$ represents the ink-pad, arranged on what, for convenience of reference, we call the "front side" of the base-board, and toward one corner of same, as shown. $a'$ $a^2$ are supports secured on the base-board.

$b$ $b$ represent two upright posts extended from top of base-board A, on opposite sides of the center of same.

$b'$ is a cross-bar extended from one to the other of the uprights $b$, at the top of the latter.

$b^2$ is a dial secured on bar $b'$, and numbered to register from one to twenty, as shown in Fig. 1.

$c$ is the main shaft. It is journaled in the base-board A and the cross-bar $b'$. It is extended above the dial $b^2$, secured on bar $b'$, and provided with an indicating-hand, $c'$.

$d$ represents a ratchet-wheel provided with teeth corresponding in number to the numbers registered by dial secured on shaft $c$, with its under side moving close to the top of supports $a'$ $a^2$. This wheel is arranged to be engaged by the pallet on canceling-arm, as will be hereinafter described.

$d'$ is a pinion-wheel, formed on lower end of shaft $c$.

$e$ represents a wheel having teeth or pins formed on its periphery, journaled in the base-board A, and arranged to mesh with the pinion $d'$. This wheel and dial is arranged below and immediately in rear of dial $b^2$, so that the mechanism is all under the eye of the operator. The relation between wheel and pinion $d'$ is ten to one, so that the pinion $d'$ has to revolve ten times in order to revolve the wheel $e$ once, the said wheel being provided on its upper face with a dial numbered by twenties from 1 to 200.

$e'$ represents a pointer secured to the base-board A, and extended up over the periphery of the wheel $e$. By this mechanism it will be seen that as the shaft $c$ is revolved it revolves the wheel $e$, and that by reference to dial on wheel $e$ for the twenties and to the dial $b^2$ for the fractions thereof the exact number registered can be determined at a glance.

$f$ represents a post extended from base-board A immediately in front of the wheel $d$. $f'$ $f^2$ are posts extended from base A on either side of post $f$, and arranged to limit the distance to which the reciprocating stamp-arm hereinafter described may be moved on either side.

$g$ represents the reciprocating stamp-arm. Its inner end is journaled on the post $f$, and its outer end is left free to be swung to the right to the ink-pad and to the left to the letters in the operation of the device, as will be described. We journal this arm loosely, so that its outer end may be raised slightly. When it is desired to change the date in the cancelers the arm $g$ may be removed from post $f$ by removing the pin which secures it thereto.

$g'$ is a handle fixed to top of outer end of arm $g$, and $g^2$ is the stamp-receptacle, in which we secure canceling and dating stamps, as it is usually now required, in addition to canceling the postage-stamp, that the date of mailing shall be marked on the letter; and it is to furnish facilities for so doing and to keep an account of the letters stamped that our machine is designed.

$h$ represents a pallet having its outer end pivoted on under side of arm $g$, and its point arranged to engage the teeth of wheel $d$ and revolve the said wheel as the arm $g$ is moved from right to left.

$h'$ is a spring-bar having one end secured to the left post, $b$, and its opposite end rested in a groove in back of the pallet $h$, and it is adapted to hold the point of pallet $h$ in contact with the wheel $d$, as shown in Fig. 1.

$i$ represents a pawl pivoted on support $a'$, and adapted to engage the teeth of wheel $d$ and prevent the said wheel from being drawn back as the canceling-arm is brought back to the pad $a$. This pawl $i$ is held in contact with wheel $d$ by the spring $i'$, as shown.

In the operation of our device the letter is placed on the base-board to the left of the pad $a$ and the arm $g$ is swung from the pad over to the letter. It will be seen that every time the arm $g$ is swung from the pad (shown in Fig. 1) to a point where its side will engage post $f^2$ the ratchet-wheel $d$ will be moved one point and the pawl $i$ will fall behind the next tooth in its rear, and one will be registered on the dial. This is the operation in canceling the three-cent stamps, which are the basis of the cancellations. In canceling postal-cards the first two of three are canceled without moving the arm far enough to register, and in canceling the third card the registry is made, making the one register for the three cards, just as for a three-cent postage-stamp. This same operation may be used in canceling newspapers, and in stamps of larger denomination than three-cents the reverse may be employed; or it will be seen that by setting the post $f^2$ farther to the left the device may be made to register two or more points at one motion of the canceling-arm, as may be desired.

Having thus described our invention, what we claim, and desire to secure by Letters Patent, is—

1. The combination, in a stamp canceling and registering machine, with the base-board A, provided with pad $a$ and pawl $i$, of the reciprocating arm $g$, carrying the stamp-canceler, pallet $h$, ratchet-wheel $d$, and the registering mechanism, substantially as and for the purposes set forth.

2. In a stamp canceling and registering machine, the combination, substantially as hereinbefore set forth, of the base-board A, the uprights $b\ b$, extended from top of the base-board, the cross-bar $b'$, connecting the top of the uprights $b$, the dial $b^2$, secured on top of cross-bar $b'$, the main shaft $c$, carrying hand $c'$, ratchet-wheel $d$, and pinion $d'$, the wheel $e'$, provided with teeth on its periphery and a dial-face, the pointer $e'$, secured to base-board and extended up over the wheel $e$, and means for revolving the ratchet-wheel $d$, substantially as set forth.

In testimony whereof we affix our signatures in presence of two witnesses.

WILLIAM C. WOODROW.
JAS. W. HENDERSON.

Witnesses:
G. BAYLESS,
A. GARNER.